United States Patent [19]
Yoshiike et al.

[11] Patent Number: 5,726,449
[45] Date of Patent: Mar. 10, 1998

[54] DETECTING APPARATUS AND MEASURING METHOD OF WARM OBJECT

[75] Inventors: Nobuyuki Yoshiike, Ikoma; Kazuhiko Hashimoto, Moriguchi; Katsuya Morinaka, Hirakata, all of Japan

[73] Assignee: Matsushita Electric Industrial Co., Ltd., Osaka, Japan

[21] Appl. No.: 760,865

[22] Filed: Dec. 5, 1996

Related U.S. Application Data

[63] Continuation of Ser. No. 433,056, May 3, 1995, abandoned.

[30] Foreign Application Priority Data

| May 9, 1994 | [JP] | Japan | 6-095169 |
| Jun. 8, 1994 | [JP] | Japan | 6-126464 |

[51] Int. Cl.$^6$ .......... G08B 13/194; G08B 13/191; G08B 13/16
[52] U.S. Cl. .......... 250/338.3; 250/DIG. 1; 340/541; 340/566; 340/567
[58] Field of Search .......... 250/DIG. 1, 338.3; 340/541, 567, 566

[56] References Cited

U.S. PATENT DOCUMENTS 5,189,393  2/1993  Hu ..................... 340/522

FOREIGN PATENT DOCUMENTS

| 0103375 | 3/1984 | European Pat. Off. . |
| 57-185695 | 11/1982 | Japan . |
| 59-198375 | 11/1984 | Japan ................. 340/541 |
| 64-088391 | 4/1989 | Japan . |
| 1-259491 | 10/1989 | Japan ................. 340/541 |
| 1-271266 | 10/1989 | Japan . |
| 2-183752 | 7/1990 | Japan . |
| 2-196932 | 8/1990 | Japan . |
| 3-82988 | 4/1991 | Japan ................. 250/DIG. 1 |
| 3-132195 | 6/1991 | Japan . |
| 6-88748 | 3/1994 | Japan ................. 250/338.3 |

OTHER PUBLICATIONS

*Patent Abstracts of Japan*, vol. 14, No. 438 (p. 1108), Sep. 19, 1990 & JP-A-02 171894 (Matsushita Electric Works Ltd.) Mar. 7, 1990.
*Patent Abstracts of Japan*, vol. 14, No. 438 (p. 1108), Sep. 19, 1990 & JP-A-02 171684 (Matsushita Electric Works Ltd.) Mar. 7, 1990.

*Primary Examiner*—Constantine Hannaher
*Attorney, Agent, or Firm*—Beveridge, DeGrandi, Weilacher & Young, LLP

[57] ABSTRACT

A warm object detector that includes an infrared object detector and an ultrasonic object detector. A thermal image signal processor obtains thermal object information representative of a warm object in an area by processing signals from the infrared object detector. An ultrasonic processor obtains ultrasonic object information representative of an object in an area by processing signals generated by the ultrasonic object detector. Then a new object determining device determines the presence of a new object in the area by comparing ultrasonic object information supplied from the ultrasonic image signal processor at a prior time with ultrasonic object information being currently supplied by the ultrasonic image signal processor. The new object determining device provides output information representative of a determined new object. Then, a new warm object determining device determines the presence of a new warm object in the area by comparing the thermal object information obtained by the thermal image processor with the output information from the new object determining processor by overlapping the thermal object information with the output information.

12 Claims, 6 Drawing Sheets

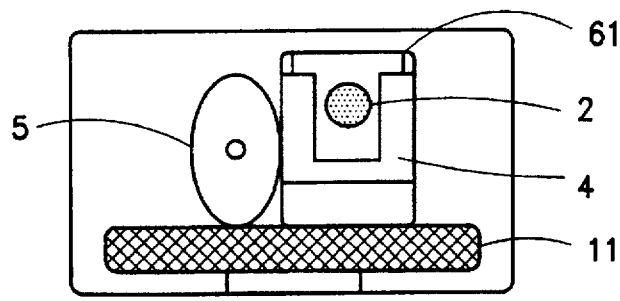
FIG. 9(a)
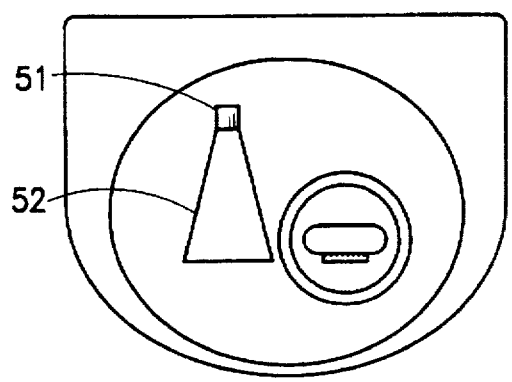
FIG. 9(b)
FIG. 10(a)
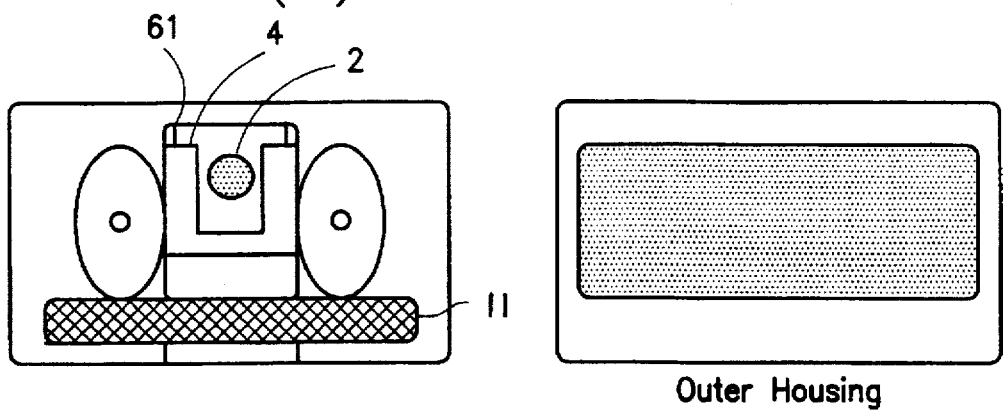
Outer Housing
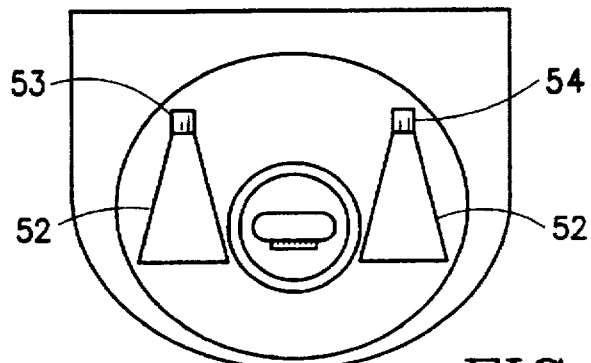
FIG. 10(b)

DETECTING APPARATUS AND MEASURING METHOD OF WARM OBJECT

This application is continuation, division of application Ser. No. 08/433,056, filed May 3, 1995, now abandoned, which application is entirely incorporated herein by reference.

BACKGROUND OF THE INVENTION

1. Industrial Field of Utilization

The present invention relates to an apparatus for detecting an object by utilizing ultrasonic waves and infrared rays.

2. Related Art of the Invention

In security and air-conditioning control, recently, there is a mounting demand for a measuring apparatus capable of detecting presence or absence or behavior of people existing in a room.

As the prior art, a method of detecting a human body by measuring the temperature distribution in the space by using infrared rays, and a method of judging presence or absence of a human body from image information by CCD visible camera have been proposed among others.

On the other hand, a method of judging a human body from the information obtained from infrared ray sensor and ultrasonic sensor is disclosed in Japanese Patent Application No. 1-271266. Or, as the method of determining the spatial temperature distribution by using a pyroelectric sensor, as disclosed in Japanese Laid-out Patent Nos. 64-88391, 57-185695, 2-183752, 2-196932, and others, using a single pyroelectric sensor, methods of determining temperature distribution by detecting input energy in each direction by scanning the pyroelectric sensor mechanically in the longitudinal direction and lateral direction have been known.

In the method of detecting a human body by measuring the temperature distribution in the space by using infrared rays, however, when a simplified two-dimensional infrared ray sensor is used, if there is an object having a temperature similar to that of a human body, it is hard to distinguish form the human body, and an error may be caused, and the judging precision is poor. In the infrared ray camera using a quantum type sensor, although the measured temperature precision and resolution are high, cooling is required in the sensor unit, and it is expensive and is not suited to use in household appliance. Moreover, judgement of presence or absence of human body by CCD visible camera is technically possible, but it is complicated to extract a human body from the image, and the apparatus becomes expensive.

SUMMARY OF THE INVENTION

The invention is devised in the light of the above problems, and it is hence a primary object thereof to present a warm object detecting apparatus of low cost, small size, and high reliability, by using an infrared ray array sensor and an ultrasonic sensor.

The invention comprises means for synchronizing and driving thermal image detecting means by an infrared ray array sensor disposing a plurality of infrared ray detecting units in an array, and object recognizing means by an ultrasonic sensor, and means for comparing and processing to judge a warm object by performing object recognition and thermal image recognition simultaneously.

In this constitution, by rotating and operating by a simple rotary drive source, the object is recognized and the thermal image is detected accurately, and by comparing and processing, the warm object can be detected precisely.

The invention is therefore effective for detecting a warm object existing in the measuring space at high precision.

BRIEF DESCRIPTION OF THE DRAWINGS

FIGS. 9(a) and 9(b) are a schematic plan view and front view, respectively of a temperature distribution measuring apparatus in a fourth embodiment of the invention.

FIGS. 10(a) and 10(b) are a schematic plan view and front view, respectively of a temperature distribution measuring apparatus in a fifth embodiment of the invention.

EMBODIMENTS

Figure 1:
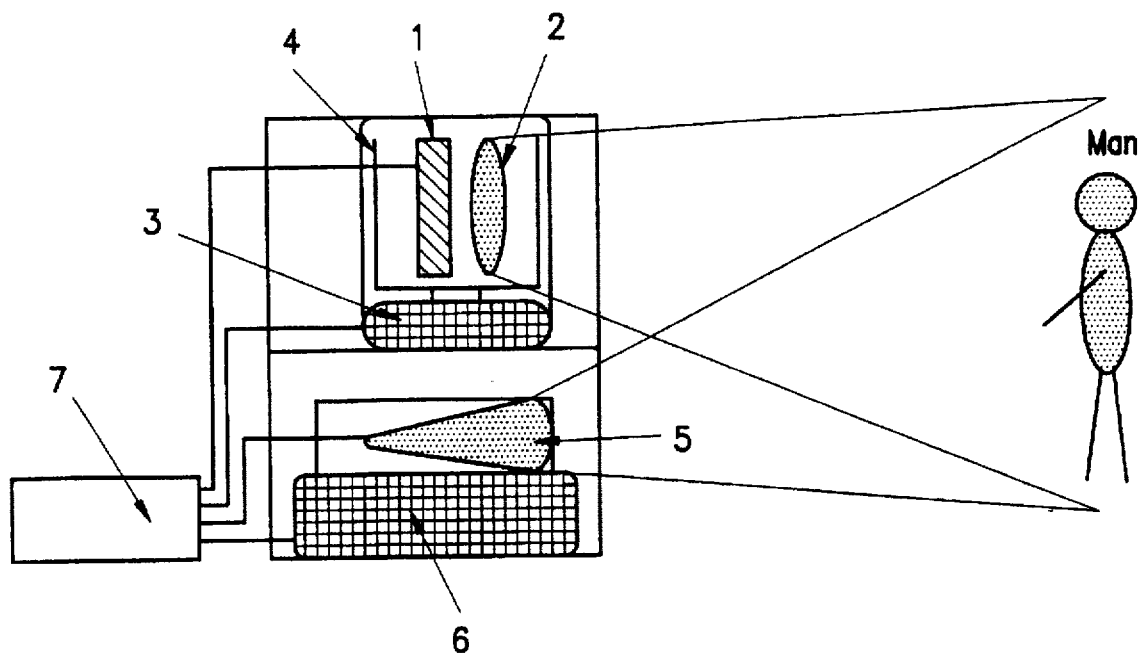
FIG. 1 is a schematic structural diagram of a warm object detecting apparatus in a first embodiment of the invention.

Referring now to the drawings, some of the embodiments of the invention are described in detail below.

(Embodiment 1)

FIG. 1 schematically shows the structure of a warm object detecting apparatus in a first embodiment of the invention, in which a pyroelectric type infrared ray sensor 1 is an array sensor having a plurality of (for example, N) infrared receptors disposed in a line in the vertical direction. This infrared ray sensor 1 and an infrared ray lens 2 disposed at the front side of the array sensor for focusing the infrared ray into the infrared ray sensor 1 are integrated into one body, and a cylindrical chopper 4 is provided at the front side of the lens 2 for intermittently shutting off the infrared ray entering the lens 2. The integrated infrared ray sensor 1 and infrared ray lens 2 are constituted so as to be free to rotate and scan in the horizontal direction by means of infrared ray sensor rotary means 3. The chopper 4 is also connected mechanically to the infrared ray sensor rotary means 3 through a transmission or the like, and is designed to rotate at a constant speed. Accordingly, the rotary scanning of the infrared ray sensor 1 and the chopper 4 are synchronously driven in a specific period.

On the other hand, an ultrasonic sensor 5 having an ultrasonic vibrator for intermittently transmitting ultrasonic pulse signals and receiving reflected waves from objects or human body is disposed so as to be rotated and scanned horizontally by ultrasonic sensor rotary means 6. A control device 7 rotates and scans the infrared ray sensor 1 and ultrasonic sensor 5, and processes signals from the sensors.

Figure 2:
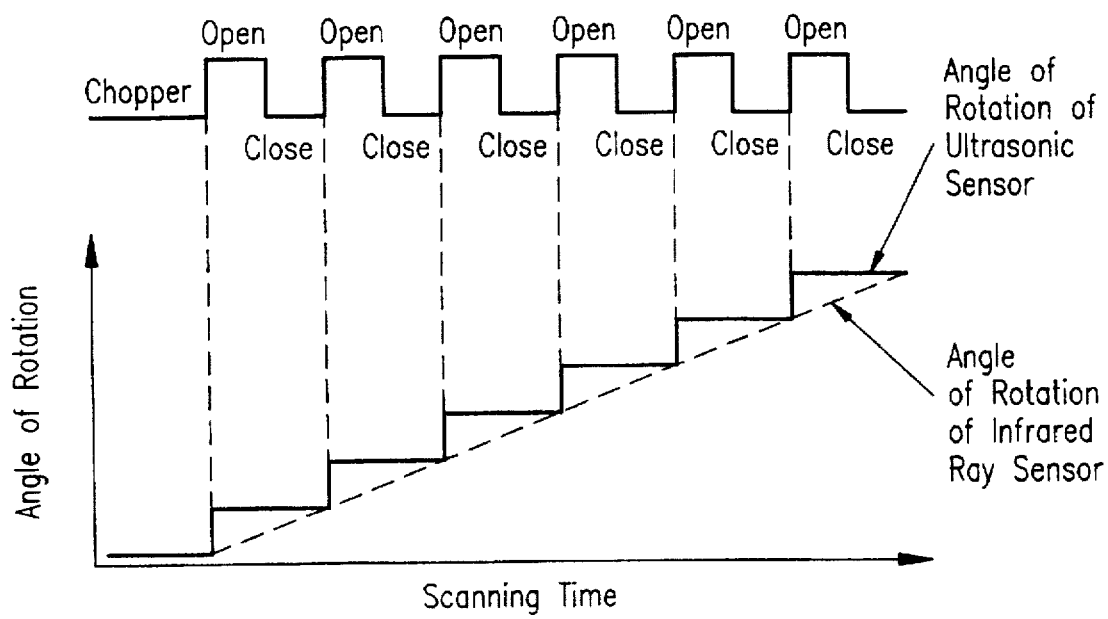
FIG. 2 is a timing chart for explaining a chopping and sensor measuring direction in the first embodiment.

Suppose the infrared ray sensor rotary means 3 and ultrasonic sensor rotary means 6 are simultaneously started by a signal from the control device 7, then rotary scanning is done at the timing shown in FIG. 2. That is, the infrared ray sensor 1 continuously rotates horizontally by q1 degrees in t1 seconds, and open/close chopping is done once by the cylindrical chopper 4. As a result, an average thermal image (for example, N*1) in the horizontal direction over a range of start position 0 degree to which the infrared ray sensor 1 confronts to q1 degrees is measured. At the same time, the ultrasonic sensor 5 rotates horizontally by q1 degrees instantly in a step, synchronously with the start signal. The ultrasonic sensor 5 immediately operates after step rotation, and transmits ultrasonic waves in the direction of q1 degrees, and receives the reflected waves, thereby measuring the echo data in the direction of q1 degrees.

By repeating this operation m times, the object can be detected by thermal image and ultrasonic waves in a range of q1*m degrees in the horizontal direction.

The obtained thermal image is a two-dimensional temperature distribution in the vertical direction as seen from the infrared ray sensor 1, and the object image by the ultrasonic echo is a two-dimensional distribution in the horizontal direction. By overlapping the thermal image and object image, a heating-generating object can be detected at high precision.

As the ultrasonic sensor 5, meanwhile, either a same ultrasonic vibrator may be used in the wave transmitting unit and wave receiving unit as in this embodiment, or separate ultrasonic vibrators may be used.

(Embodiment 2)

Figure 3:
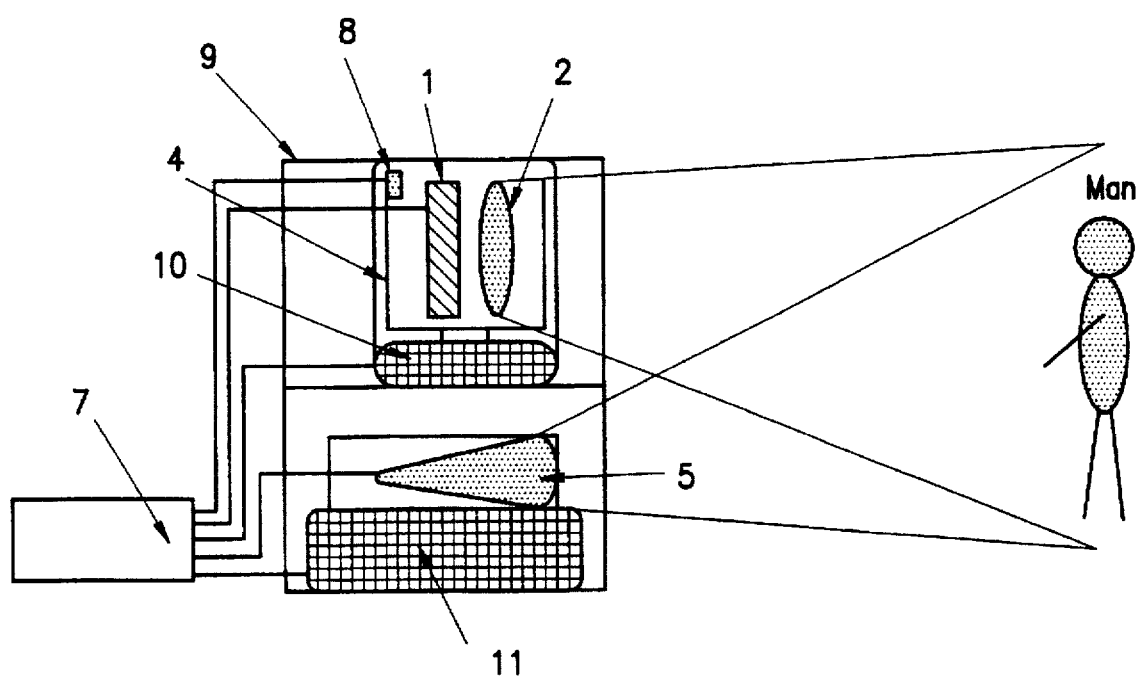
FIG. 3 is a schematic structural diagram of a warm object detecting apparatus in a second embodiment of the invention.
Figure 4:
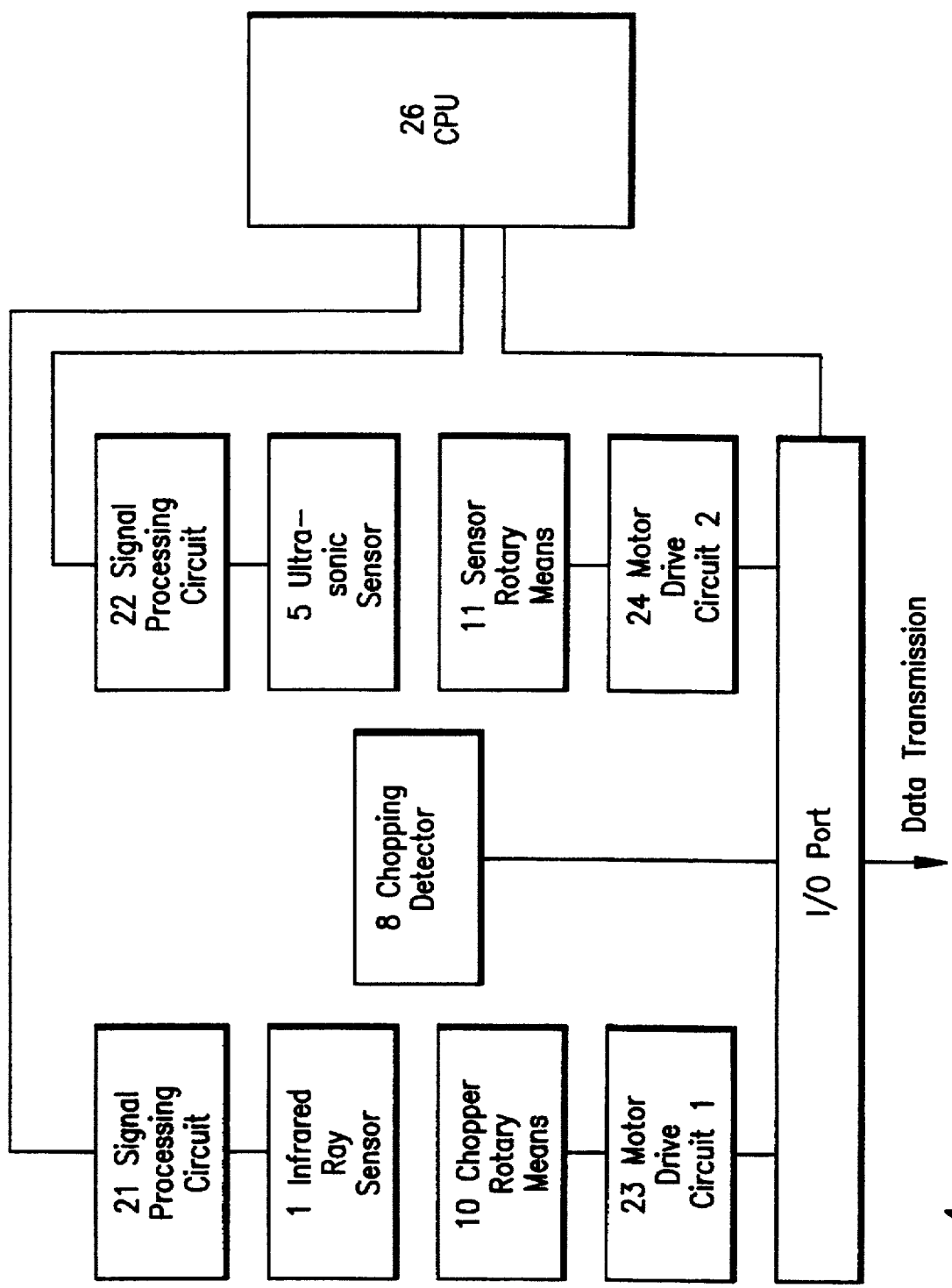
FIG. 4 is a block diagram of an electric circuit system in the second embodiment.

FIG. 3 shows a schematic structure of a second embodiment of the invention, and FIG. 4 is a block diagram of its drive and signal processing circuit.

In an infrared ray sensor unit 9, a pyroelectric type infrared ray sensor 1 is an array sensor having a plurality of (for example, N) infrared receptors disposed in a line in the vertical direction. This infrared ray sensor 1 and an infrared ray lens 2 disposed at the front side of the array sensor for focusing the infrared ray into the infrared ray sensor 1 are integrated into one body, and fixed. A cylindrical chopper 4 is provided at the front side of the lens 2 for intermittently shutting off the infrared ray entering the lens 2. The chopper 4 is connected mechanically to chopper rotary means 10, and rotates, at a constant speed. Chopping detector 8 is composed of photo interrupter and others. The infrared ray sensor unit 9 and ultrasonic sensor 5 are integrated, and mounted on sensor rotary means 11, so as to be free to rotate and scan in the horizontal direction. A control device 7 rotates and scans the sensors, and processes signals from the sensors.

The chopper rotary means 10 is started by a signal from the control device 7 through a motor drive circuit (1) 23, and measurement is started. The chopping speed is driven, for example, at 1 to 100 Hz. The chopping detector 8 senses the open/closed state of the chopper 4, and sends a low/high signal to the control device 7.

Figure 5:
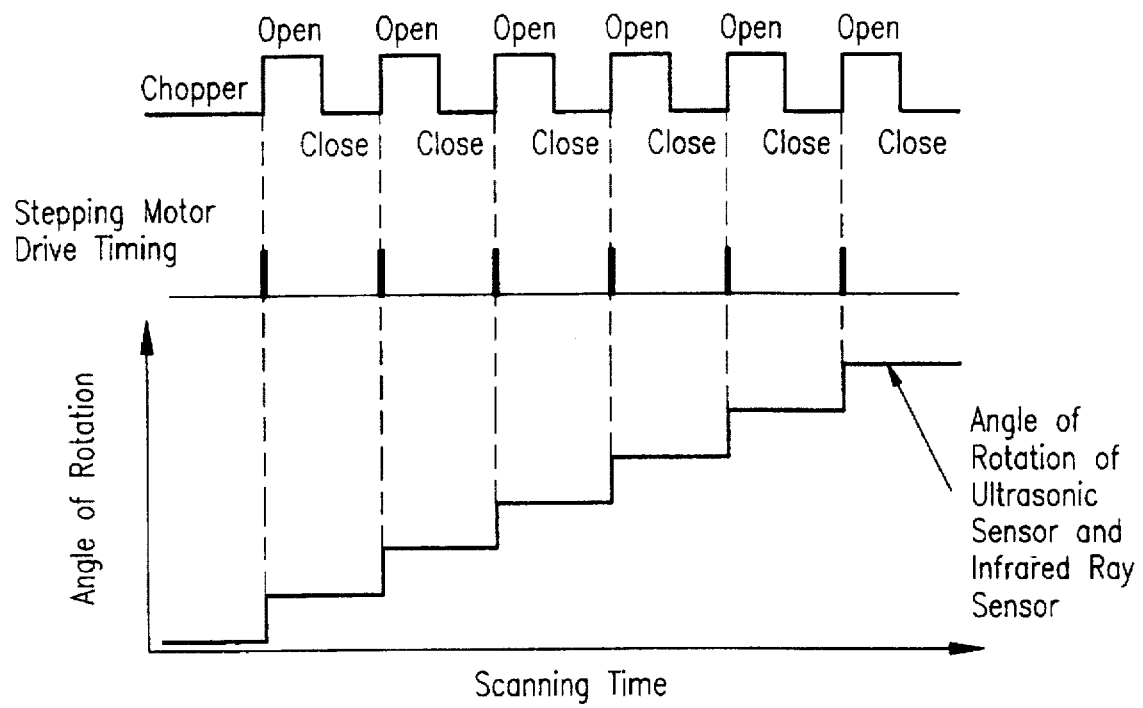
FIG. 5 is a timing chart for explaining a chopping and sensor measuring direction in the second embodiment.

The control device 7 receives the low/high signal from the chopping detector 8, and drives sensor rotary means 11 through motor drive circuit (2) 24. The sensor rotary means 11 rotates the integrated sensor in steps in synchronism with open/close rotation of the chopper 4 in a specific period, at the timing shown in FIG. 5. That is, the infrared ray sensor 1 and ultrasonic sensor 5 instantly rotate horizontally in a step from start position to q1 degrees, simultaneously with opening of the chopper, and stop once. At this time, by the cylindrical chopper 4, open/close chopping is done once. Consequently, the thermal image (for example, N*1) in the direction of q1 degrees from the start position to which the infrared ray sensor 1 confronts is measured through a signal processing circuit 21, and the information is transmitted to the CPU 26. At the same time, the ultrasonic sensor 5 immediately operates, and transmits ultrasonic waves in the direction of q1 degrees, and receives reflected waves, thereby measuring the echo data in the direction of q1 degrees, and the result of measurement is transferred to a CPU 26 through a signal processing circuit 22.

By repeating this operation m times, measurement is done in a range of q1*m degrees in the horizontal direction, and by processing the measured data in the CPU 26, the object can be detected by two-dimensional thermal image and ultrasonic waves. Supposing the horizontal rotary scanning angle to be 120 degrees, in the case of q1 =1.5 degrees, it follows that m =80, and when the chopping speed is, for example, 10 to 100 Hz, N*80 pixels of thermal image and object image are obtained in 8 to 0.8 seconds.

The obtained thermal image is a two-dimensional temperature distribution in the vertical direction as seen from the infrared ray sensor 1, and the object image by the ultrasonic echo is a two-dimensional distribution in the horizontal direction. The thermal image and object image are data of which pixels are in same direction, and can be easily compared. Therefore, by overlapping them, a heat-generating object can be detected precisely. After completing measurement in the final confronting direction, by rotating the motor reversely in a stroke, it is returned to the initial confronting direction, thereby making it possible to measure repeatedly.

Figure 6:
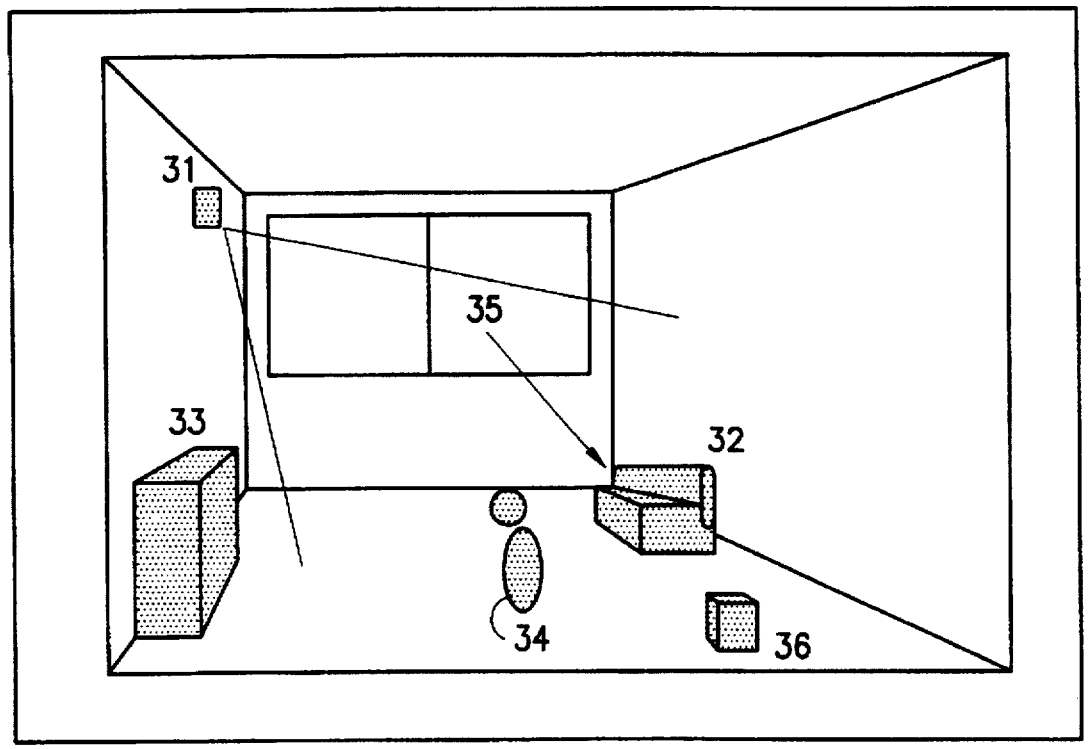
FIG. 6 is a perspective view for explaining a measuring state in the second embodiment.

FIG. 6 shows a mode of measurement. In the room shown in FIG. 6, a closet 33 and a sofa 32 are installed, and a sensor unit 31 of the warm object detecting apparatus of the invention is mounted on the wall. Suppose the condition in which the sunlight 35 enters from outside and the sofa 32 in the room is warmed.

Figure 7:
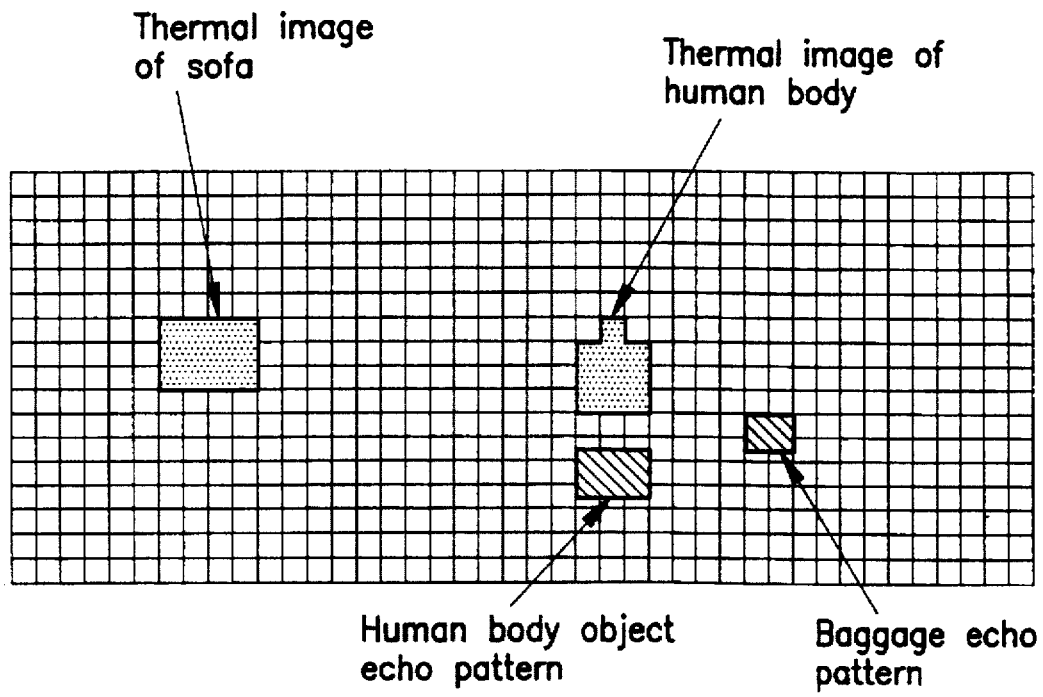
FIG. 7 is a pattern diagram showing the result of measurement of the warm object detecting apparatus in the second embodiment.

First, by the ultrasonic sensor 5, the echo pattern of a deserted room is measured. Then a man carrying a baggage enters the room, and the sensors are actuated, thereby measuring a two-dimensional thermal image by the infrared ray sensor 1 and an object echo pattern by the ultrasonic sensor 5. The echo pattern extracts a newly entering object image by the difference from the echo pattern in the initial state measured in advance. Therefore, the closet 33 and sofa 32 are not issued as object image because they exist from the beginning. The result is shown in FIG. 7 together with the thermal image. The solid black portion indicates the thermal image, and the shaded area is the echo pattern. The thermal image is recognized near the position of the man 34 and the sofa 32, and the position of the man 34 and the position of the baggage 36 are recognized in the echo pattern.

When detecting the invading man 34, when judged by the thermal image only, it is judged that two people are present at the position of the actual man 34 and at the position of the sofa 32, or when judged by the data of the ultrasonic sensor 5 only, invading objects are recognized at the position of the actual man 34 and at the position of the baggage 36, and hence it is also judged that two people are newly present. However, by overlapping the thermal image and object detection, supposing what is overlapped with the thermal image by a newly invading object to be a human body, one human body was judged, and the human body was detected at high precision.

When there are plural human bodies, if there is a man nearby or if there are plural people in one remote place, it is difficult to judge by one measured temperature distribution.

but it was possible to judge empirically by the time-course changes of the take-in temperature distribution. It was moreover possible to judge further precisely by introducing the fuzzy stochastics using membership function in judgement.

(Embodiment 3)

Figures 8A, 8B:
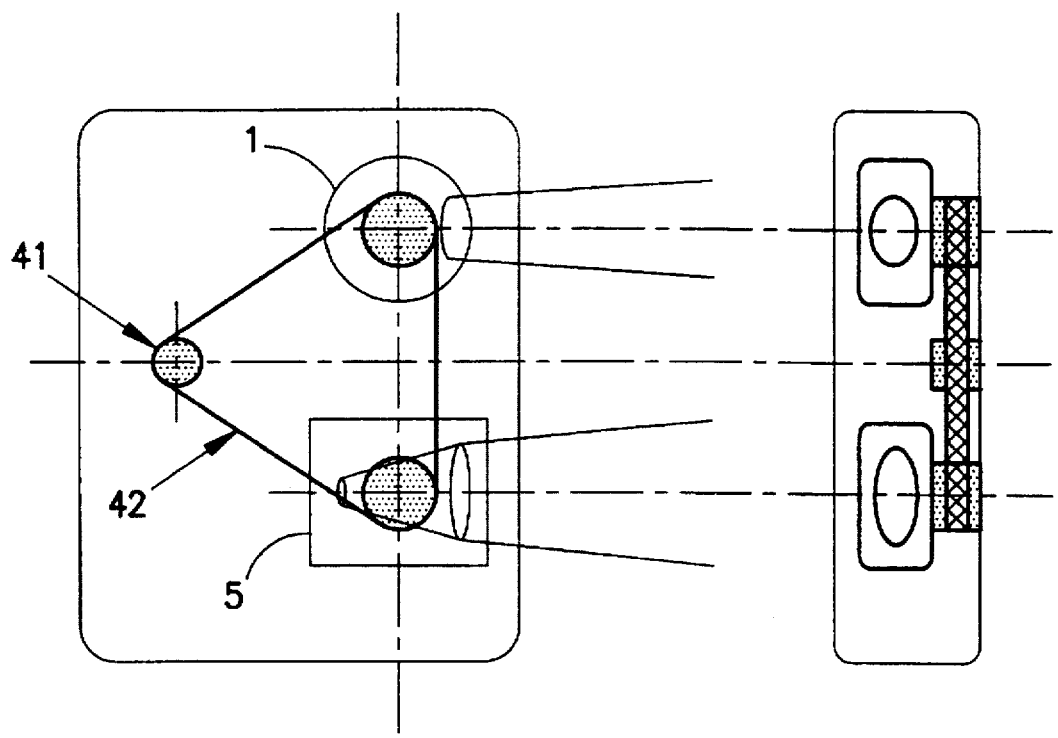
FIGS. 8(a) and 8(b) are a schematic plan view and front view, respectively of a temperature distribution measuring apparatus in a third embodiment of the invention.

A third embodiment is shown in FIGS. 8(a) and 8(b), in which 8(a) is a plan view, and 8(b) is a front view. An infrared ray sensor 1 and an ultrasonic sensor 5 are rotated and scanned through a belt 42 for rotation by one stepping motor 41. As the means of transmitting rotations of the stepping motor 41, a gear mechanism may be used aside from the belt 42 for rotation. In this constitution, the apparatus can be reduced in thickness.

(Embodiment 4)

A fourth embodiment is shown in FIGS. 9(a) and 9(b), in which 9(a) is a plan view, and 9(b) is a front view. On sensor rotary means 11 using a stepping motor, infrared ray detecting means composed of a pyroelectric element fixing unit 61 fixing a pyroelectric element, an infrared ray lens 2, and a chopper 4, and an ultrasonic sensor 5 composed of an ultrasonic detecting unit 51 and a horn 52 are mounted, and are rotated and scanned. The ultrasonic detecting unit 51 has a function of both transmitter and receiver. In this case, the stepping motor may be directly connected mechanically to the rotary means, or it may be driven indirectly by using a belt for rotation as means for transmitting rotations. In such constitution, the apparatus can be reduced in thickness.

(Embodiment 5)

A fifth embodiment is shown in FIGS. 10(a) and 10(b), in which 10(a) is a plan view, and 10(b) is a front view. On sensor rotary means 11 using a stepping motor, infrared ray detecting means composed of a pyroelectric element fixing unit 61 fixing a pyroelectric element, an infrared ray lens 2, and a chopper 4, and object recognizing means are mounted side by side, and the infrared ray detecting means and object recognizing means are rotated and scanned. The object recognizing means is composed of an ultrasonic wave transmitting unit 53 and a horn 52 for transmitting ultrasonic waves, and an ultrasonic wave receiving unit 54 and a horn 52 for receiving the transmitted ultrasonic waves. The stepping motor may be directly connected mechanically to the rotary means, or it may be driven indirectly by using a belt for rotation as means for transmitting rotations. In such constitution, the apparatus can be reduced in thickness.

(Embodiment 6)

The sensors in embodiment 3 were mounted on a television set, and it was attempted to measure intermittently, that is, when the television is in ON state. By comparison between the signal from the ultrasonic sensor in each measurement, and the two-dimensional background object position information in a deserted room with a television set (for example, in the midnight) recorded previously, a new object is detected. Furthermore, by comparing and processing the detected new object and the two-dimensional thermal image by the signal from the infrared ray detecting means, a new warm object is detected. That is, by the signal from the infrared detecting means, a two-dimensional thermal image is created, and by the signal from the object recognizing means, a two-dimensional object position image is created. By overlapping the created two-dimensional thermal image and object position image, and judging the warm object as a human body, the number of people actually watching the television could be accurately detected.

What is claimed is:

1. A warm object detecting apparatus comprising:
   an infrared object detector including a pyroelectric type infrared ray sensor with a plurality of detecting units in an array, an infrared ray focusing lens for focusing the infrared rays entering the infrared ray array sensor, chopping means for intermittently shutting off the infrared rays, and an infrared ray sensor rotary means for rotating a confronting direction of the infrared ray array sensor,
   thermal image signal processing means for obtaining thermal object information representative of a warm object in a space by using signals from the infrared object detecting means,
   ultrasonic object detecting means including an ultrasonic sensor for transmitting ultrasonic waves and receiving reflected waves, and ultrasonic sensor rotary means for rotating a confronting direction of the ultrasonic sensor,
   ultrasonic image signal processing means for obtaining ultrasonic object information representative of an object in the space by using signals from the ultrasonic object detecting means,
   new object determining means for determining a presence of a new object in the space by comparing ultrasonic object information supplied from the ultrasonic image signal processing means at a prior time with ultrasonic object information supplied by the ultrasonic image signal processing means at a later time, the new object determining means providing output information representative of a determined new object, and
   new warm object determining means for determining a presence of a new warm object in the space by comparing thermal object information obtained by the thermal image processing means with output information from the new object determining means, the new warm object determining means overlapping the thermal object information with output information from the new object determining means.

2. A warm object detecting apparatus of claim 1, wherein the infrared ray sensor rotary means and the ultrasonic sensor rotary means are synchronized with the chopping means in a specific period, and wherein the chopping means performs open/close chopping at least multiple times every time the sensor confronting surfaces make one step rotation.

3. A warm object detecting apparatus of claim 2, wherein the operation of the chopping means and each sensor rotary means is controlled by a signal from external control means.

4. A warm object detecting apparatus of claim 2, further comprising:
   a chopping signal detector for detecting a driving state of the chopping means, and
   a stepping motor responsive to a signal from the chopping signal detector, for driving the infrared ray array sensor and the ultrasonic sensor.

5. A warm object detecting apparatus of claim 1, wherein the infrared ray sensor rotary means and the ultrasonic sensor rotary means are shared, and a stepping motor is used in driving of the rotary means.

6. A warm object detecting apparatus of claim 5, wherein the infrared object detector is provided beside the ultrasonic sensor, and its confronting direction is rotated as one body.

7. A warm object detecting apparatus of claim 5, wherein the ultrasonic sensor is composed of a transmitting unit for transmitting ultrasonic waves and a receiving unit for receiving reflected waves, and the infrared object detector is disposed between the transmitting unit and the receiving unit.

8. A warm object detecting apparatus of claim 1, wherein the detecting apparatus includes a stepping motor, and wherein the infrared ray sensor rotary means and the ultrasonic sensor rotary means are mechanically connected to the stepping motor through a rotary belt, thereby being rotated synchronously by the stepping motor.

9. A warm object detecting apparatus of claim 1, wherein the infrared ray sensor rotary means is responsive to output information from the new object determining means to begin rotating to the confronting direction of the infrared ray sensor.

10. A method of detecting a warm object with an infrared object detecting means including a pyroelectric type infrared ray sensor with a plurality of detecting units in an array, an infrared ray focusing lens for focusing the infrared rays entering the infrared ray array sensor, chopping means for intermittently shutting off the infrared rays, and infrared ray sensor rotary means for rotating a confronting direction of the infrared array sensor, and ultrasonic object detecting means including an ultrasonic sensor for transmitting ultrasonic waves and receiving reflected waves, and ultrasonic sensor rotary means for rotating a confronting direction of the ultrasonic sensor, said method comprising the steps of:

obtaining thermal object information representative of a warm object in a space by using signals from the infrared object detecting means, obtaining ultrasonic object information representative of an object in the space by using signals from the ultrasonic object detecting means, determining a presence of a new object in the space by comparing ultrasonic object information obtained at a prior time with ultrasonic object information obtained at a later time, providing information representative of a new object if a new object is determined to be present, and determining a presence of a new warm object in the space by comparing thermal object information obtained during the step of obtaining thermal object information with information representative of a new object provided during the step of providing information representative of a new object by overlapping the thermal object information with the information representative of a new object.

11. A warm object detecting method of claim 10, wherein said step of obtaining thermal object information comprises obtaining a two-dimensional temperature distribution, and said step of obtaining ultrasonic object information comprises obtaining a two-dimensional object distribution.

12. A warm object detecting method of claim 10, further comprising the steps of causing the infrared ray sensor rotary means to rotate the confronting direction of the infrared ray sensor and causing the infrared ray sensor to begin scanning, in response to provided information that a new object is present.

* * * * *